United States Patent
Van Dorp (10) Patent No.: US 12,007,219 B2
(45) Date of Patent: Jun. 11, 2024

(54) LASER TRIANGULATION APPARATUS AND CALIBRATION METHOD

(71) Applicant: ASML Netherlands B.V., Veldhoven (NL)

(72) Inventor: Erwin Van Dorp, Veldhoven (NL)

(73) Assignee: ASML Netherlands B.V., Veldhoven (NL)

( * ) Notice: Subject to any disclaimer, the term of this patent is extended or adjusted under 35 U.S.C. 154(b) by 281 days.

(21) Appl. No.: 17/282,141

(22) PCT Filed: Sep. 9, 2019

(86) PCT No.: PCT/EP2019/073985
§ 371 (c)(1),
(2) Date: Apr. 1, 2021

(87) PCT Pub. No.: WO2020/069822
PCT Pub. Date: Apr. 9, 2020

(65) Prior Publication Data
US 2021/0356252 A1 Nov. 18, 2021

(30) Foreign Application Priority Data
Oct. 2, 2018 (EP) .................................. 18198239

(51) Int. Cl.
*G01B 11/06* (2006.01)
*G01B 21/04* (2006.01)
*G01C 3/08* (2006.01)

(52) U.S. Cl.
CPC ........ *G01B 11/0608* (2013.01); *G01B 21/042* (2013.01); *G01C 3/08* (2013.01)

(58) Field of Classification Search
CPC ..... G01B 11/0608; G01B 21/042; G01C 3/08
(Continued)

(56) References Cited

U.S. PATENT DOCUMENTS

| 4,645,348 A | 2/1987 | Dewar et al. |
| 5,208,642 A | 5/1993 | Narutaki |

(Continued)

FOREIGN PATENT DOCUMENTS

| JP | 2006-030157 A | 2/2006 |
| JP | 2011-117940 | 6/2011 |

(Continued)

OTHER PUBLICATIONS

International Search Report and Written Opinion of the International Searching Authority directed to related International Patent Application No. PCT/EP2019/073985, dated Dec. 10, 2019; 11 pages.

(Continued)

*Primary Examiner* — Isiaka O Akanbi
(74) *Attorney, Agent, or Firm* — Sterne, Kessler, Goldstein & Fox P.L.L.C.

(57) ABSTRACT

The invention provides an apparatus configured for determining a distance of the apparatus to an object according to the principle of triangulation. The apparatus comprises a transmissive device with a predefined distance between a first surface and a second surface of the transmissive device, and a detector that is configured to receive at least a portion of a radiation beam after interaction with the transmissive device and the object. The first surface is arranged to reflect a first part of the radiation beam, and the second surface is arranged to reflect a second part of the radiation beam. The predefined distance is used for determining the distance of the apparatus to the object.

18 Claims, 3 Drawing Sheets

(58) Field of Classification Search
USPC .................................................. 356/608–624
See application file for complete search history.

(56) References Cited

U.S. PATENT DOCUMENTS

| | | | | |
|---|---|---|---|---|
| 6,426,232 | B1 * | 7/2002 | Litvak | B24B 37/013 |
| | | | | 356/601 |
| 6,573,999 | B1 * | 6/2003 | Yang | G01B 11/0625 |
| | | | | 356/630 |
| 6,683,695 | B1 * | 1/2004 | Simpson | G01N 21/896 |
| | | | | 356/445 |
| 6,952,253 | B2 | 10/2005 | Lof et al. | |
| 7,808,525 | B2 | 10/2010 | Katayama | |
| 2013/0215409 | A1 * | 8/2013 | Wiethege | G01S 7/4816 |
| | | | | 356/3.01 |
| 2014/0036274 | A1 | 2/2014 | Marquardt et al. | |
| 2018/0074198 | A1 * | 3/2018 | Von Novak | G01S 7/487 |

FOREIGN PATENT DOCUMENTS

| | | |
|---|---|---|
| JP | 2017-015572 A | 1/2017 |
| JP | 2017-198475 A | 11/2017 |

OTHER PUBLICATIONS

Chen et al., "Depth from Refraction Using a Transparent Medium with Unknown Pose and Refractive Index," International Journal of Computer Vision, vol. 102, Mar. 2013; pp. 3-17.

* cited by examiner

LASER TRIANGULATION APPARATUS AND CALIBRATION METHOD

CROSS-REFERENCE TO RELATED APPLICATIONS

This application claims priority of EP application 18198239.8 which was filed on 2 Oct. 2018 and which is incorporated herein in its entirety by reference.

FIELD

The present invention relates to a distance measurement device and method. More particularly, the invention relates to a triangulation displacement apparatus for the measurement of a distance between the apparatus and an object and to an optical in-line calibration method without moving parts.

BACKGROUND

A technique for accurately measuring a distance to an object surface is through the use of triangulation displacement sensors. These sensors operate on the basic principle wherein a radiation beam is projected onto an object under measurement and a part of the radiation beam is reflected onto a receiving element, typically a linear array photoelectrical detector. A distance measurement is accomplished when the radiation beam is projected onto and reflected at the object surface, whereby the reflected radiation beam is received by the detector at a position displaced from a calibrated baseline position, corresponding to a calibrated distance. The distance of the object with respect to the sensor defines the position of the radiation beam striking the receiving element. Thus, when the distance between the object and the sensor changes, the beam position on the receiving element changes. Before the displacement sensor can be used, a precise mapping relationship between the input—the spatial distance between the sensor and the object—and the output variables needs to be known. This is achieved by a calibration.

Displacement sensors are used in ultra-precision measurements of geometrical quantities such as position, vibration, and profile measurements of surfaces. Using, for example, triangulation techniques, a distance to an object or a displacement of the object with respect to a reference, for example the sensor, can be determined with high resolution even when a non-contact measurement is required. In a lithography apparatus (more information on lithography apparatuses is given in U.S. Pat. No. 6,952,253), for example, positions of moving parts, e.g., a moving stage, need to be known very accurately. This means that the position of these parts are monitored frequently, which can be accomplished by means of triangulation using displacement sensors. The same accounts for metrology apparatuses, where the position of a carrier, for example a wafer stage, needs to be known with high precision. Additionally, measuring and monitoring positions of optical elements, for example lenses or gratings used in metrology devices and camera systems, may also be performed by triangulation displacement sensors arranged in lithography apparatuses, metrology apparatuses, as well as in photography devices. Finally, it is evident that the use of displacement sensors is not limited to moving stages or optical elements, but may also be applied to a variety of (quasi-)static parts that are subject for drift.

The accuracy of displacement sensors is affected by inherent systematic errors, such as the linearity error deviation from a linear calibration line, of the sensor output. Although displacement sensors may have a sub-micrometer resolution, the linearity error may be much larger than the resolution level. Since the linearity error is typically not stationary, for example due to environmental changes, displacement sensors require frequent calibration in order to ensure reliable measurement results. It is common to calibrate the triangulation displacement sensor (or more generally, the apparatus) by placing gauge standards in the measurement radiation beam with accurately known position. These gauge standards are positioned nearby or in the object plane and replace the object to be measured. Typically, the measurement apparatus needs to be removed from the system or functional environment where it is being used, for example a lithographic apparatus, in order to perform the calibration: ex-situ calibration. But, the environmental conditions of the system may differ from the environmental conditions during the ex-situ calibration. An in-situ calibration may be advantageous when the displacement sensor is accessible to place the gauge standards in the radiation beam. In both in-situ and ex-situ calibration procedures, external gauge standards need to be moved and placed in and out the radiation beam during the calibration procedure, which is not only time-consuming and tedious to operate, these calibration methods result in downtime of the system.

SUMMARY

It is an object of the invention to provide a distance measurement apparatus based on the triangulation technique that does not require moving calibration elements, in and out of the system, for calibrating the apparatus. In view of the above, the invention provides an apparatus for determining a distance of the apparatus to an object comprising a transmissive device, which has a predefined distance between a first surface and a second surface of the device. The first surface of the transmissive device is arranged to reflect a first part of a radiation beam, and the second surface of the transmissive device is arranged to reflect a second part of the radiation beam. The apparatus further comprises a detector configured to receive at least a portion of the first part of the radiation beam on a first location on the detector, to receive at least a portion of the second part of the radiation beam on a second location on the detector, and to receive at least a portion of the radiation beam after interaction with the transmissive device and with the object on a third location on the detector. The apparatus comprises a processor configured to receive a signal from the detector to determine the distance of the apparatus to the object based on the spatial distance between the first location and the second location, and the spatial distance between the first location and the third location, and or the spatial distance between the second location and the third location.

In view of the above, the invention provides an apparatus for distance measurements comprising an internal reference or gauge. That is, the transmissive device provides the first surface and the second surface that are used as two reference surfaces. The mutual distance between these two reference surfaces is predefined. Herewith, the transmissive device may be used as a gauge standard. The first and second part of the radiation beam reflected by the first and second surface, respectively, are received at different locations on the detector, i.e., the first and second location. Hereby, the spatial distance between the first and second surface is translated into a location difference on the detector. Thus, a radiation beam reflected by an object and at least partially received by the detector at a location on the detector, may be correlated to a spatial distance between the object and the first surface and or the second surface or the apparatus.

Since the apparatus comprises the transmissive device that may be used as a gauge standard, recordings by the detector of the radiation beam reflected by the object may be compared with the recordings corresponding to the radiation beam reflected at the surfaces of the transmissive device. Thus, each measurement may be calibrated by means of the reflections originating from the transmissive device without inserting an external gauge standard for in-situ calibration, or without removing the apparatus from its environment for ex-situ calibration.

In an embodiment, the apparatus comprises a transmissive device configured by a transmissive plate. The first surface is on one side of the transmissive plate and the second surface is on the opposite side of the transmissive plate. Using a plate instead of, for example, two separated and individual elements is preferred in view of stability. In case of a transmissive plate, first and second surfaces are rigidly connected. Herewith, the distance between both surfaces is conserved.

In an embodiment, the transmissive device is a plane-parallel transmissive plate. Both first and second surfaces of the transmissive device are orientated equally, such that the radiation beam reflected at the first surface and the radiation beam reflected at the second surface of the transmissive plate propagate parallel to each other. Herewith, the distance between the transmissive plate and the detector does not affect the spatial distance between the first location and the second location of the reflected radiation beams on the detector.

In an embodiment, the transmissive device is provided with at least one tunable reflective surface. The at least one tunable reflective surface may comprise a switchable mirror and the reflectance may be controlled via a controller. The at least one reflective surface may be switched to a pure reflective state, a pure transmissive state, or to an intermediate state. This has the advantage that the amount of radiation power passing the first surface and or the second surface can be controlled, and herewith also the intensity of the reflected radiation beams interacting with the detector. In addition, by tuning the reflectance, and thus the transmittance, of the transmissive device, the radiation power impinging the object can be controlled. This may be required to prevent radiation induced damage to the object.

In an embodiment, the apparatus comprises at least a first transmissive plate with a first predefined thickness and a second transmissive plate with second predefined thickness. In another embodiment, the apparatus comprises a plurality of transmissive plates each with a predefined thickness. Each transmissive plate may introduce additional reflected beams. Each transmissive plate is arranged to direct the additional reflected radiation beams onto the detector. Thus, providing the distance measurement device with a transmissive device that comprises more than one transmissive plate, the number of reflected radiation beams, and corresponding recordings by the detector, may be increased. This may be beneficial to improve the calibration and the linearity of the apparatus, since the number of reference positions is increased.

In an embodiment, the transmissive device is arranged not to intersect the radiation beam reflected from the object. This is achieved by a recess for passage of the radiation beam reflected from the object without interaction with the transmissive device. In this way, the radiation beam reflected from the object is not influenced by the transmissive device. Herewith, additional reflection and or absorption of the reflected radiation beam is prevented.

In an embodiment, the radiation beam comprises at least a first and a second radiation beam, wherein the first and second radiation beams intersect the transmissive device geometrically different. By using at least two radiation beams that are orientated differently with respect to each other, the distance between the object and the apparatus can be measured for at least two locations on the object. This enables distance measurements in more than one dimension.

In an embodiment, the apparatus comprise a temperature sensor to monitor environmental changes. A change in the environmental temperature can, for example, change geometrical properties of the transmissive device. As a consequence, the reference positions as recorded by the detector may be shifted in response to the geometrical change. By monitoring the temperature of the apparatus, such a thermally induced shift can be observed and corrected for.

In an embodiment, the apparatus comprises a processor configured to control the intensity of the radiation beam, and or, the wavelength of the radiation beam, and or, the reflectance of at least one of the surfaces of the transmissive device. By controlling the optical properties of the radiation beam and or the transmissive device, the distance measurement can be optimized for and or adapted to the surface properties of the object.

According to an aspect of the invention, there is provided a lithographic apparatus comprising an apparatus as set forth herein. The apparatus may be used to measure a distance or a displacement of an object, for example a stage or an optical element within the lithographic apparatus.

According to a further aspect of the invention, there is provided a metrology apparatus comprising an apparatus as set forth herein. The apparatus may be used to measure a distance or a displacement of an object, for example a moving stage or an optical element within the metrology apparatus.

According to an aspect of the invention, there is provided a camera system comprising an apparatus as set forth herein. The camera system may, for example, be used for imaging purposes in metrology devices or even in photography devices. The position of optical elements in the camera system may deviate from the expected position, for example, caused by drift, wear, and or hysteresis, and can be measured and or monitored by use of the apparatus.

BRIEF DESCRIPTION OF THE DRAWINGS

Embodiments of the invention will now be described, by way of example only, with reference to the accompanying schematic drawings, in which:

FIG. 1, consisting of FIGS. 1a, 1b, and 1c, depicts a schematic overview of a common method for calibrating a triangulation displacement sensor;

FIG. 5, consisting of FIGS. 5a and 5b, depicts schematic illustrations of a transmissive device that may be used in an embodiment of the invention; and, FIG. 6 depicts a schematic illustration of a transmissive device that may be used in an embodiment of the invention.

DETAILED DESCRIPTION

Preferred embodiments of the invention is now described with reference to the figures, where like reference numbers indicate identical or functionally similar elements. The components of the present invention, as generally described and illustrated in the figures, may be implemented in a wide variety of configurations. Thus, the following more detailed description of the embodiments of the apparatus and method of the present invention, as represented in the figures, is not intended to limit the scope of the invention, as claimed, but is merely representative of preferred embodiments of the invention.

Figure 1A:
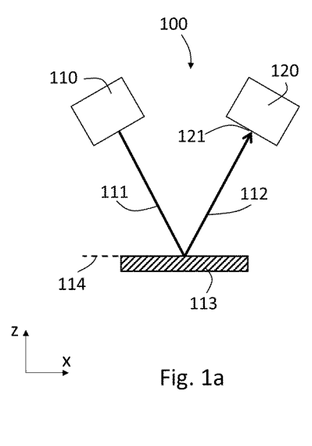
Figure 1B:
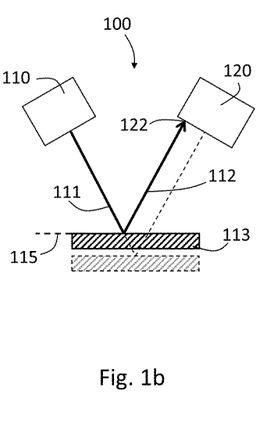
Figure 1C:
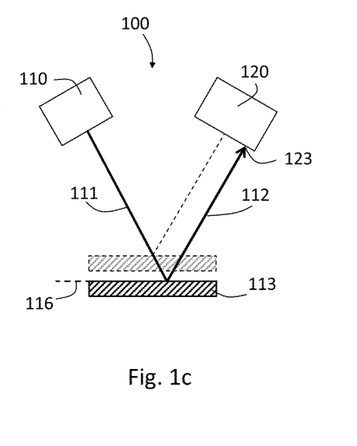

FIG. 1 schematically depicts a method used to calibrate a triangulation displacement sensor 100, also referred as a distance measurement device or as an apparatus. The common calibration method may comprise several procedure steps as illustrated in FIGS. 1a to 1c. The number of calibration steps is in this example limited to three, for simplicity reasons. It will be appreciated by the person skilled in the art that more steps may be involved to improve the calibration or accuracy. The common calibration procedure steps are now described in more detail.

During a first step of the calibration procedure, as is illustrated by FIG. 1a, a radiation source 110 provides a beam of radiation 111 to an object 113 that is positioned at a known, or predefined, distance from the sensor 100. The object 113 is used as a gauge standard during the calibration procedure. Radiation beam 111 reflects on a surface of the object 113 at a first position 114, herewith forming reflected radiation beam 112. First position 114 may be referred as a reference position or the zero-position. A detector 120 is configured to receive at least a part of the reflected radiation beam 112. Typically, detector 120 comprises an array of radiation sensitive elements or pixels, for example a CCD image sensor or a CMOS image sensor. The detector 120 is arranged such that the reflected radiation beam 112 strikes the detector 120 at a first pixel position 121, corresponding to the first position 114.

At a second step of the calibration procedure, illustrated by FIG. 1b, the distance of the object 113 is changed with respect to the sensor 100 (the object moves along the z-axis) whereby the radiation beam 111 reflects on the surface of the object 113 at a second position 115, which is a different position than the zero-position 114. As a result, the reflected radiation beam 112 strikes the detector 120 at a second pixel position 122 that corresponds to the second position 115, which is shifted from the first pixel position 121 that corresponds to a first position 114 of the gauge standard or object 113.

At a third step of the calibration procedure, illustrated by FIG. 1c, object 113 is displaced along the z-axis such that the radiation beam 111 reflects on the object surface at a third position 116, which is a different position than the first position 114 and the second position 115. Herewith, the reflected radiation beam 112 strikes the detector 120 at a third pixel position 123 that corresponds to the third position 116, which is a position on the detector that is different from the first pixel position 121 and the pixel position 122.

During the illustrated calibration procedure, the three positions of the object surface (114, 115, and 116) are determined with high accuracy. Measurements of these calibrated object positions are typically performed by an external apparatus.

Instead of positioning the gauge standard at different z-positions, a single gauge standard with different height steps, for example with three levels corresponding to the three different positions 114, 115, and 116, may also be used for calibrating the triangulation displacement sensor 100. Similar as positioning the gauge standard 113 at different positions, the height differences of each step needs to be measured and calibrated accurately.

By the correlation between the object positions (114, 115, and 116) or heights step of the gauge standard 113 and the positions of the reflected radiation beam 112 striking the detector 120 (pixel positions 121, 122, and 123), the triangulation displacement sensor 100 is calibrated. A processor arranged to assess a look-up table or a mathematical function that translates the pixel position of the detector 120 to a z-position is commonly used for the position or displacement calibration and measurements. By determining the pixel position of a radiation beam 112 reflected from a surface of a measurement object at an unknown position, the position of the object is determined based on the calibration results.

The triangulation displacement sensor 100 depicted in FIG. 1 is a schematic illustration. It is evident that optical elements, for example lenses or mirrors, may be used to shape and or to focus radiation beam 111 and or 112. For reasons of clarity, these optical components are not displayed in the figure.

As is illustrated in the previous paragraphs, an external gauge standard 113 needs to be positioned in front of the triangulation displacement sensor or distance measurement device 100 with high accuracy. This means that the sensor 100 needs to be removed from its functional environment, for ex-situ calibration, or that the gauge standard 113 is needs to be accurately placed in the system where the sensor 100 is arranged, for in-situ calibration. In both situations, the triangulation displacement sensor 100 needs to accessible. In addition, the environmental conditions may be disturbed by inserting the gauge standard 113.

Figure 2:
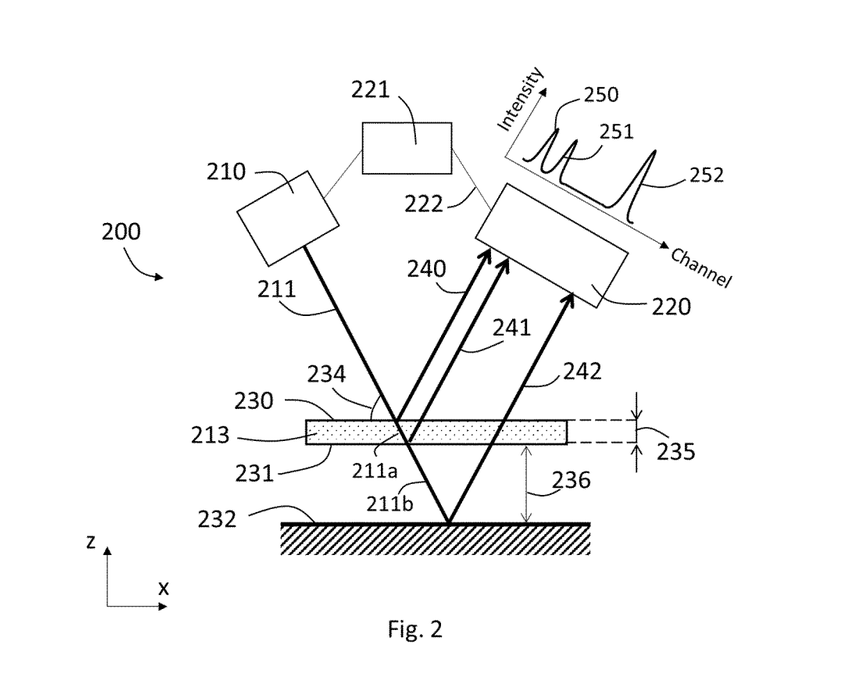
FIG. 2 depicts a schematic illustration of an embodiment of an apparatus of the present invention.

FIG. 2 depicts an embodiment of the invention, illustrating an apparatus 200 for determining a position of an object 232, generally speaking for determining a distance between the object 232 and the apparatus 200 or for determining a displacement of the object 232 in reference with the apparatus 200, based on the triangulation technique that does not require moving calibration elements in and out of the system for calibrating the apparatus 200. Apparatus 200 is also referred as a triangulation displacement sensor or as a distance measurement device. A radiation beam 211 provided by a radiation source 210 interacts with a transmissive device 213 with a predefined distance 235 between a first surface 230 and a second surface 231 of the device. Radiation beam 211 is at least partially reflected at the first surface 230 providing a first reflected radiation beam 240. A part of radiation beam 211 may be transmitted at the first surface 230 and may interact with the second surface 231. The first transmitted radiation beam 211a may partially reflected at the second surface 231 providing a second reflected radiation beam 241. A part of the transmitted radiation beam 211a may be transmitted at the second surface 231, forming a second transmitted radiation beam 211b, which may interact with the object 232, for example the object under investigation, which is displaced by a distance 236 from the second surface 231. The second transmitted radiation beam 211b may be at least partially reflected on the surface of the object 232 and herewith providing a third reflected radiation beam 242.

In a preferred embodiment, the transmissive device 213 is a transmissive plate, hereafter also referred as a transmissive calibration plate, with a predefined thickness 235. The first surface 230 is on one side of the transmissive plate 213 and the second surface 231 is on the opposite side of the transmissive plate 213. Using a transmissive plate 213 has the advantage that the distance between the first surface 230 and the second surface 231 can be measured accurately and remains stable in time. It is also preferred to have a stiff and a rigid transmissive device 213 to function as a calibration standard (transmissive calibration plate). In addition, a transmissive calibration plate 213 arranged in the apparatus may also prevent the apparatus of contamination and or disturbances from its environment.

The triangulation displacement sensor 200 comprises a detector 220, arranged to receive and to detect at least a portion of the reflected radiation beams 240, 241, and 242. Each of the reflected radiation beams (240 to 242) impinges detector 220 at a different location. The detector 220 detects the intensity of radiation incident upon its surface and produces an output signal that is indicative of the intensity of the radiation. The detector 220 may comprise an array of radiation sensitive elements, commonly noted as pixels. The array of radiation sensitive elements may be formed by a CCD image sensor or a CMOS image sensor. First reflected radiation beam 240 may impinge the detector 220 at a first pixel position 250. Second reflected radiation beam 241 travels a second time through the transmissive device 213 before impinging the detector at second pixel position 251. The third reflected radiation beam 242 may travel a second time through the transmissive device 213 before interacting with radiation sensitive array at pixel position 252.

The transmissive device 213 is preferably a plan-parallel transmissive plate. Herewith, propagation paths of the first reflected radiation bema 240 and the second reflected radiation beam 241 are parallel. Transmissive devices with non-parallel surfaces, for example when the surface plane formed by the second surface 231 is tilted with respect to the surface plane formed by the first surface 230, may also be used. But non-parallel transmissive plates require an additional calibration step since the second reflected radiation beam 241 may diverge from the first reflected radiation beam 240. In such a situation, the distance between the transmissive plate 213 and the detector 220 determines the difference in pixel position between the first pixel position 250 and the second pixel position 251. For the plan-parallel transmissive plate 213 the reflected radiation beams (240, 241) do not diverge, and hereby the difference in pixel position between the first pixel position 250 and the second pixel position 251 on the detector 220 is not governed by the distance between the plan-parallel transmissive plate 213 and the detector 220.

FIG. 2 depicts a graph that illustrates the radiation intensity as received and recorded by a pixel, or a set of pixels, as a function of the pixel number, also reported as the channel number. Each pixel position corresponds to a point of reflection. For example, first pixel location 250 corresponds to the reflection on the first surface 230 of the calibration plate 213. Hence, a correlation between pixel position and object (or position of reflection) can be obtained. This information can be stored in a look-up table, which may be accessible by a processor 221.

Radiation beam 211 may be arranged to interact with the plan-parallel transmissive plate 213 with an angle of incidence 234 larger than zero. Herewith, the paths of the first 240 and second reflection beam 241 directed to the detector 220 are spatially separated. The spatial separation of both beam paths is determined by the thickness 235 of the plan-parallel transmissive plate 213 and the angle of incidence 234, as schematically illustrated in FIG. 2.

As is illustrated by FIG. 2, the transmissive device 213 may induce at least two recordings at the detector 220. The difference in pixel position of the first pixel position 250 and the second pixel position 251 is governed by the angle of incidence 234 of the radiation beam 211 with the transmissive device 213 and an optical path length between the first surface 230 and the second surface 231 of the transmissive device 213. The optical path length is determined by the geometrical distance between both surfaces, or plate thickness, 235 and the refractive index of the material between the first 230 and second surface 231. By accurately measuring the distance 235, or in case of a transmissive plate the thickness, as well as defining the refractive index of the enclosed material, the pixel position difference between the first pixel position 250 and the second pixel position 251 become a measure of a known length or distance. Thus, the transmissive device 213, which may be a plan-parallel transmissive plate, arranged in the apparatus 200 may be used to calibrate the apparatus 200 without placing an external gauge standard.

By the correlation between the predefined thickness 235 of the transmissive plate 213 and the difference in pixel position for the recordings of the first 240 and second 241 reflection beams, the distance 236 between the apparatus 200 and the object 232 is determined by means of the pixel position 252 recorded for the third reflection beam 242. That is, the apparatus 200 comprises a processor 221 configured to receive a signal 222 from the detector 220 to determine the distance of the apparatus 200 to the object 213 based on the spatial distance between the first pixel location 250 and the second pixel location 251, and the spatial distance between the first pixel location 250 and the third pixel location 252, and or the spatial distance between the second pixel location 251 and the third pixel location 252.

Referring to FIG. 2, during a distance measurement of object 232 the reflected radiation beams of the transmissive device 213 are also recorded. Thus, the reference positions (250 and 251) and the position 252 of the object 213 under investigation are recorded at the same time. This means that calibration of the apparatus 200 may be performed during an actual distance or displacement measurement. This has the benefit that no external gauge standard is required to (re) calibrate the apparatus 200.

The skilled person will appreciate that the measurement accuracy and the measurement range may be set by the angle of incidence 234. That is, reducing the angle of incidence 234 of radiation beam 211 results in an increased spatial spread of the reflected radiation beams, and thus an increased difference in pixel position. Herewith, the distance measurement range of the apparatus 200 may be limited by the geometrical size or spatial capture range of the radiation sensitive array of the detector 220. By increasing the angle of incidence 234, the spatial spread of the reflected radiation beams reduces as well as the difference in pixel position. This in turn may be beneficial if the distance measurement range of the apparatus 200 needs to be enlarged.

The angle of incidence 234 may be tunable to alter and to define the detection range.

The spot of the radiation beam impinging the detector 220 may be larger in size than a single pixel. This means that more than one pixel may receive the reflected radiation. Herewith distributing the radiation power over an ensemble, or a set, of pixels. In such a case, one may determine the (weighted) average, or the central pixel number, of the pixel ensemble in order to define the reference positions or the measurement position.

Radiation source 210 may be laser, a superluminescent diode (SLD), or a light emitting diode (LED) arranged to provide directly or via an optical fiber at least a radiation beam 211 to the apparatus 200. The skilled person will appreciate that a fiber may be used to provide the radiation beam 211 to the apparatus 200, which enables placement of the radiation source 210 at a remote position with respect to the apparatus 200. This may be beneficial for maintenance point-of-view as well as from a technical point-of-view, for example to avoid thermal influences of the radiation source 210 to the apparatus environment.

The radiation beam 211 may comprise a single radiation wavelength or a plurality of wavelengths. A wavelength selection may be made to improve the measurement accuracy. That is, radiation beams of different wavelengths may interact with the surface of the object 232 differently. By using a set of radiation wavelengths, the wavelength dependency may be circumvented.

A skilled person in the art will appreciate that the apparatus 200, used as a triangulation displacement sensor, may comprise one or more optical elements. The apparatus may, for example, comprise one or more lenses and or mirrors that are arranged to direct, to shape, and or to focus the radiation beam 211 and or the reflected radiation beams 240 to 242.

The apparatus 200 may comprise a processor 221 configured to receive a signal 222 from the detector 220. The detector signal 222 comprises at least information of the pixels (250, 251, 252) that are irradiated by the reflected radiation beams (240, 241, 242). The processor 221 may be arranged to assess a look-up table or a mathematical function that translates the pixel position of the detector 220 to a z-position for determining the position or displacement of the object 232.

The processor 221 may comprise a controller to control the radiation source 210. For example, the intensity and or the wavelength of the radiation beam 211 may be controlled by the controller.

Figure 3:
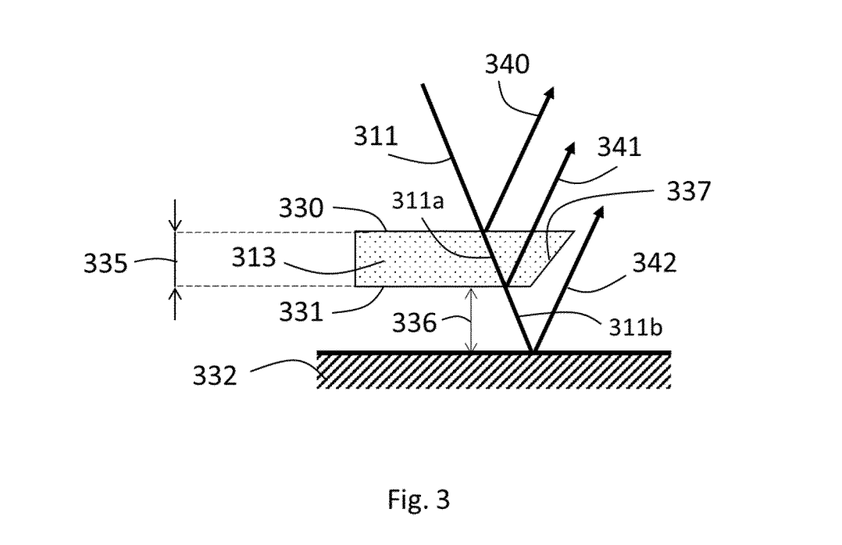
FIG. 3 depicts a schematic illustration of a transmissive device that may be used in an embodiment of the invention.

FIG. 3 depicts an embodiment of a transmissive device 313 that may be used in the apparatus 200, as shown in FIG. 2. Radiation beam 311 is arranged to interact with the transmissive device 313. The radiation beam 311 is at least partially reflected at a first surface 330 providing a first reflected radiation beam 340. A part of radiation beam 311 may be transmitted and interacts with a second surface 331. The first transmitted radiation beam 311a may partially reflected at the second surface 331 providing a second reflected radiation beam 341. A part of the transmitted radiation beam 311a may be transmitted at the second surface 331, forming a second transmitted radiation beam 311b, and may interact with an object 332, for example the object under investigation, which is displaced by a distance 336 from the second surface 331. The second transmitted radiation beam 311b may be at least partially reflected on the surface of the object 332 and herewith providing a third reflected radiation beam 342.

As illustrated in FIG. 3, transmissive device 313 is arranged not to interact with the radiation beam 342 that is reflected from the object 332. An advantage of this embodiment is less disturbance by the transmissive device 313. That is, in case the third reflected radiation beam 342 would interact with the transmissive device 313, see for example the third radiation beam 242 in FIG. 2, a portion of the third reflected radiation beam is reflected on the second surface 331 and the first surface 330 of the transmissive device 313, which reduces the radiation intensity as received by a detector 220. In addition, optical transmission losses may occur due to absorption of radiation by the material enclosed by the first 330 and second 331 surface. Both the reflections and the absorption may not preferred.

The transmissive device 313 may be a transmissive plate comprising a side surface 337 that is arranged orthogonal to one or to both first 330 and second surface 331 of the transmissive plate 313. In an different embodiment, for example as is illustrated in FIG. 3, the transmissive plate 313 comprises a chamfered side surface 337. This may be beneficial for measuring distances to an object 332 near the apparatus 200, wherein the distance 336 is of the same order as the thickness 335 of the transmissive plate thickness 313.

Figure 4:
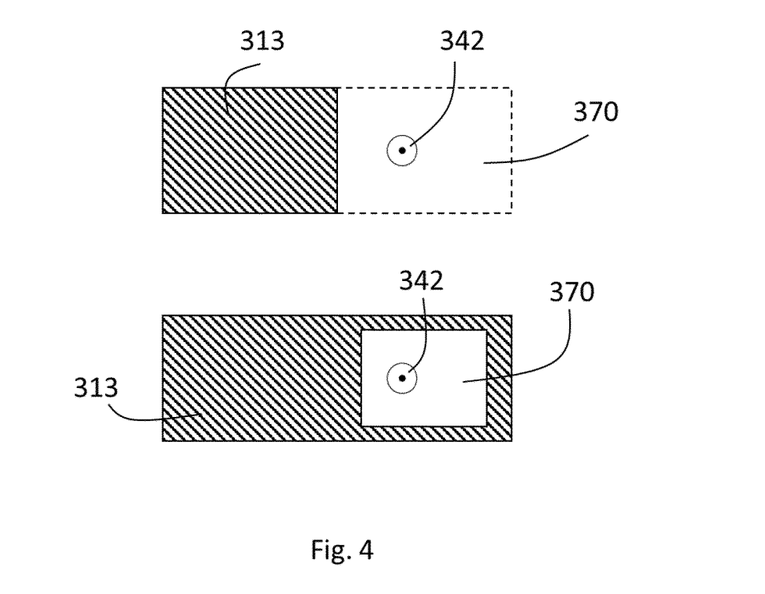
FIG. 4 depicts a top-view illustration of a transmissive device in accordance with the invention.

The third reflected radiation beam 342 may not interact with the transmissive device 313 due to a recess, an opening, or an clearance area 370 in the transmissive device 313, as is illustrated in FIG. 4. FIG. 4 depicts top-views of two schematic embodiments of a cleared area 370 in the transmissive plate 313. In an embodiment, at the position where the third reflected beam 342 is expected to pass, a part of the transmissive plate 313 may be missing. That is, the size of the transmissive plate 313 is such that is does not interfere with the third reflected beam 342. It may be advantageous to extend the transmissive plate 313, for example for mechanical stiffness, environmental conditioning, or to avoid contamination of the apparatus 200. Herewith, material may be removed to create the opening 370 in the transmissive plate 313. The opening 370 may be in the form of a square, a rectangle, or a circle.

Figure 5A:
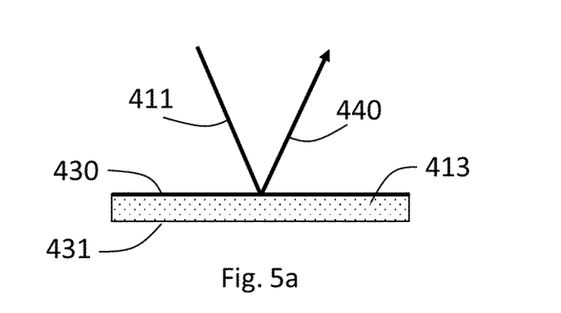
Figure 5B:
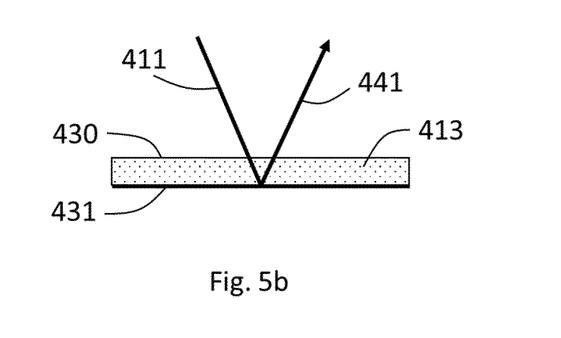

FIGS. 5a and 5b schematically illustrate an embodiment of a transmissive device 413 (or transmissive plate) that may be used in the apparatus 200, which is used as a triangulation displacement sensor, provided with controllable reflectivity of a first surface 430 and a second surface 431, respectively. One or both surfaces (430, 431) may comprise a switchable mirror, also known as a smart glass, of which the reflectivity can be regulated by applying an electric signal to the switchable mirror. The switchable mirror may consist of a thin film liquid crystal layer or a thin alloy film deposited either on first 430 or second 431 surface of the transmissive plate 413, or on both surfaces of the transmissive plate 413.

In the situation as illustrated by FIG. 5a, the switchable mirror at the first surface 430 is switched to a pure reflection state. Hereby, radiation beam 411 is reflected by the first surface 430 providing first reflected radiation beam 440. In the situation as illustrated by FIG. 5b, the switchable mirror at the first surface 430 is switched to a transparent state and the switchable mirror at the second surface 431 is switched to a pure reflection state. Hereby, radiation beam 411 is transmitted through the transmissive plate 413 and reflects on the switchable mirror at the second surface 431, providing a second reflected radiation beam 441.

It will be appreciated by the skilled person that each switchable mirror may be switched to an intermediate state. The switchable mirror may be a tunable reflective surface. For example, the switchable mirror at the first surface 430 may switched and tuned to a state with a 70% transmittance.

Providing one or more surfaces of the transmissive plate 213 (413) with a switchable and tunable mirror may be beneficial to control the radiation intensity interacting with the transmissive plate 213 and or the object 232. Such an arrangement may, for example, be used to ensure sufficient radiation intensity in the first reflected radiation beam 240 and or second reflected radiation beam 241 for calibrating the apparatus 200 prior to a distance measurement.

In addition, by tuning the reflectance, and thus the transmittance, of at least one surface of the transmissive device 213, the radiation power impinging the object 232 can be controlled. This may be required to prevent radiation induced damage to the object 232.

Figure 6:
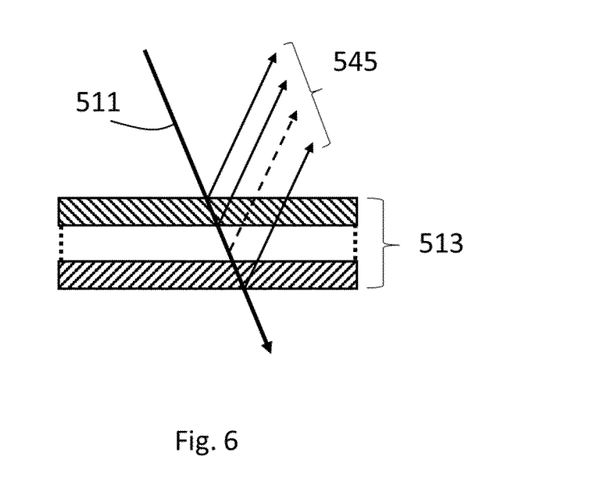

The transmissive device 213 may comprise a first and a second transmissive plate, both with a predefined thickness. Or as is illustrated by FIG. 6, transmissive device 513 may comprise a plurality of transmissive plates (transmissive calibration plates), each with a predefined thickness, that may be arranged in the apparatus 200. Each optical plate may introduce additional reflected beams. Thus, providing the apparatus 200 with the transmissive device 513 that comprises more than one transmissive plate, the number of reflected radiation beams 545 may be increased. This may be beneficial to improve the calibration of the apparatus 200, since the number of reference positions, i.e., reflection positions and pixel position, is increased. And with more than two positions, linearity of the system can be checked and calibrated for.

Each of the surfaces of the transmissive device 513 may comprise a switchable mirror. Herewith, the reflectance and transmittance of each surface may be tunable.

It will be appreciated by the skilled person that the apparatus 200 (used as a triangulation displacement sensor or as a distance measurement device) may comprise more than one radiation beam 211 to determine the distance to the object 232. By arranging at least a first and a second radiation beam that intersect with the transmissive device 213 geometrically different, for example each radiation beam has a different angle of incidence 234, or each radiation beam propagates at a different location, or each radiation beam has a different geometrical orientation, the measurement accuracy may be improved. Additionally, a (quasi-) two-dimensional distance measurement may be performed by using more than one radiation beam. Both first and second radiation beams may have the same wavelength. Different wavelengths may also be provided, for example, in order to optimize the received intensity of the radiation beam 242 reflected by the object 232. That is, the object 232 may interact differently with radiation of different wavelengths.

Environmental temperature may influence the accuracy of a distance measurement. For example, a change in the environmental temperature can change geometrical properties of the transmissive device. As a consequence, the reference positions as recorded by the detector may be shifted in response to the geometrical change. To prevent erroneous distance measurements, the apparatus 200 may comprise a temperature sensor. Herewith, thermally induced changes within the apparatus 200 can be monitored and can be taken into account when determining the distance to the object.

The apparatus 200 as described above may be applied in an ambient environment, in a vacuumed environment, as well as in a high-pressure environment.

An lithography apparatus may comprise one or more apparatuses 200 according to an embodiment of the invention, used as a triangulation displacement sensor. The one or more apparatuses 200 may be used to measure and or to monitor a position of a stage, for example a reticle stage or a wafer stage. The one or more apparatuses 200 may also be configured to monitor the movement of optical components, for example lenses, mirrors and or gratings, within a metrology device used in a lithography apparatus. Accessibility to the stages as well as the metrology devices within a lithography apparatus is commonly difficult. In-situ calibration is in general not possible due to the accessibility of the triangulation displacement sensors, which means that the triangulation displacement sensors need to be calibrated ex-situ. Applying triangulation displacement sensors 200 according to an embodiment of the invention, would not require the build-out or the removal of the triangulation displacement sensors for (ex-situ) calibration. This in turn is beneficial for the productivity of the lithography apparatus.

In camera systems, for example used for imaging purposes in metrology devices or even photography devices, the position of optical elements may deviate from the expected position. Deviations may, for example, caused by drift, wear, and or hysteresis of the optical elements. This may result in incorrect recordings or out of focus images. It may be preferred to measure or to monitor a position of one or more lenses by means of triangulation. Providing the camera system with one or more apparatuses 200 according an embodiment of the invention may bring the advantage of in-situ and real-time calibration of the triangulation displacement sensor (apparatus 200) and herewith bringing the opportunity to correct for incorrect positions of one or more optical elements.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. An apparatus for determining a distance of the apparatus to an object comprising:
    a transmissive device with at least one tunable reflective surface comprising a switchable mirror, the transmissive device having a predefined distance between a first surface and a second surface of the device, wherein:
        the first surface is arranged to reflect a first part of a radiation beam, and
        the second surface is arranged to reflect a second part of the radiation beam,
    a detector configured to receive at least a portion of:
        the first part of the radiation beam on a first location on the detector,
        the second part of the radiation beam on a second location on the detector, and
        the radiation beam after interaction with the transmissive device and with the object on a third location on the detector, and
    a processor configured to receive a signal from the detector to determine the distance of the apparatus to the object based on a spatial distance between the first location and the second location, and at least one of:
        a spatial distance between the first location and the third location, and
        a spatial distance between the second location and the third location.

2. The apparatus of claim 1, wherein:
the transmissive device is a transmissive plate,
the first surface is on one side of the transmissive plate, and
the second surface is on an opposite side of the transmissive plate.

3. The apparatus of claim 2, wherein the transmissive device is plane-parallel.

4. The apparatus of claim 2, wherein the transmissive device comprises at least:
a first transmissive plate with a first predefined thickness,
a second transmissive plate with a second predefined thickness, or
a plurality of transmissive plates, each with a predefined thickness.

5. The apparatus of claim 2, wherein the transmissive device is arranged not to intersect the radiation beam reflected from the object.

6. The apparatus of claim 5, wherein the transmissive device comprises a recess configured to pass the radiation beam reflected from the object without interaction with the transmissive device.

7. The apparatus of claim 1, wherein:
the radiation beam comprises at least a first and a second radiation beam, and
the first and second radiation beams intersect the transmissive device geometrically different.

8. The apparatus of claim 1, further comprising a temperature sensor.

9. The apparatus of claim 1, wherein the processor is configured to control at least one of an intensity of the radiation beam or a wavelength of the radiation beam.

10. A lithographic apparatus comprising at least one apparatus of claim 1.

11. A metrology apparatus comprising at least one apparatus of claim 1.

12. A camera system comprising at least one apparatus of claim 1.

13. A method for determining a distance of an apparatus to an object, the method comprising:
providing a beam of radiation;
projecting the beam of radiation onto a transmissive device with at least one tunable reflective surface comprising a switchable mirror, the transmissive device being arranged in the apparatus;
irradiating the object with at least a portion of the beam of radiation transmitted through the transmissive device;
receiving at least a portion of a first part of the beam of radiation reflected by a first surface of the transmissive device on a first location on a detector;
receiving at least a portion of a second part of the beam of radiation reflected by a second surface of the transmissive device on a second location on the detector;
receiving at least a portion of the beam of radiation after interaction with the transmissive device and with the object on a third location on the detector; and
deriving the distance of the apparatus to the object based on a spatial distance between the first location and the second location, and at least one of:
a spatial distance between the first location and the third location, and
a spatial distance between the second location and the third location.

14. The method of claim 13, wherein the transmissive device has a predefined distance between the first surface and the second surface of the transmissive device.

15. The method of claim 13, wherein:
the transmissive device is a transmissive plate,
the first surface is on one side of the transmissive plate, and
the second surface is on an opposite side of the transmissive plate.

16. The method of claim 13, wherein the transmissive device is plane-parallel.

17. The method of claim 13, wherein the transmissive device comprises at least:
a first transmissive plate with a first predefined thickness,
a second transmissive plate with a second predefined thickness, or
a plurality of transmissive plates, each with a predefined thickness.

18. The method of claim 13, wherein the transmissive device is arranged not to intersect the radiation beam reflected from the object.

* * * * *